United States Patent [19]

Yates et al.

[11] Patent Number: 5,314,009
[45] Date of Patent: May 24, 1994

[54] EXHAUST GAS RECUPERATOR

[75] Inventors: Jan B. Yates, Reynoldsburg, Ohio;
David W. Procknow, Wauwatosa,
Wis.; **Brett J. Peterson; Gary D.
Goplen,** both of Stoughton, Wis.

[73] Assignee: Gas Research Institute, Chicago, Ill.

[21] Appl. No.: 958,221

[22] Filed: Oct. 8, 1992

[51] Int. Cl.⁵ .................... F16D 65/14; F16F 9/30;
F16F 9/50
[52] U.S. Cl. ........................ 165/72; 165/51;
165/75; 165/135; 165/142; 181/211; 181/268;
181/283
[58] Field of Search ............... 165/142, 72, 51, 75,
165/135; 181/211, 268, 283

[56] References Cited
U.S. PATENT DOCUMENTS

| | | | |
|---|---|---|---|
| 1,511,056 | 10/1924 | Ercanbrack | 165/142 |
| 1,759,582 | 5/1930 | Lonsdale | 165/142 |
| 2,274,066 | 2/1942 | Jacocks | 165/142 |
| 2,397,208 | 3/1946 | Saco, Jr. et al. | 165/135 |
| 2,505,393 | 4/1950 | Garner | 165/142 |
| 2,620,167 | 12/1952 | Hopp | 165/135 |
| 2,706,106 | 4/1955 | Roswell | 165/142 |
| 2,706,620 | 4/1955 | Graves | 165/142 |
| 2,730,337 | 1/1956 | Roswell | 165/142 |
| 2,853,277 | 9/1958 | Bone, Jr. et al. | 165/142 |
| 3,105,708 | 10/1963 | Esty | 285/41 |
| 4,027,631 | 6/1977 | Lavery | 122/26 |
| 4,450,932 | 5/1984 | Khosropour et al. | 182/211 |
| 4,593,748 | 6/1986 | Kramb | 165/1 |
| 4,685,292 | 8/1987 | Brigham et al. | 60/320 |
| 4,685,430 | 8/1987 | Ap | 123/142.5 R |
| 4,693,079 | 9/1987 | Wuensche et al. | 60/320 |
| 4,694,894 | 9/1987 | Kito et al. | 165/135 |
| 4,852,366 | 8/1989 | Harris | 62/238.6 |
| 4,907,738 | 3/1990 | Harris | 237/2 B |
| 5,003,788 | 4/1991 | Fischer | 62/238.7 |
| 5,004,042 | 4/1991 | McMorries, IV et al. | 165/41 |

FOREIGN PATENT DOCUMENTS

| | | | |
|---|---|---|---|
| 1163627 | 3/1984 | Canada | 165/142 |
| 3140687 | 4/1983 | Fed. Rep. of Germany | 165/75 |
| 404946 | 1/1934 | United Kingdom | 165/142 |

*Primary Examiner*—John K. Ford
*Attorney, Agent, or Firm*—Watkins, Dunbar & Pollick

[57] ABSTRACT

The cylindrical enclosure 12 of a recuperator 10 as in FIG. 2 contains an annular coaxial heat exchanger 50 full of cooling liquid 22 circulating therethrough. Exhaust gas from an internal combustion engine flows from an inlet end 32 through the heat exchanger 50, first in an axial region 15 via a conduit 14, then back through a surrounding annular region 18, then through tubes 37 to an outlet end 34. The inlet 30 and outlet 31 for the gas are in the side wall 40 of the cylindrical body 12, and the exhaust gas 11 enters and leaves via conduits 14 and 19 that are perpendicular to the side wall 40 at the inlet 30 and at the outlet 31. So the ends 41 and 42 of the body 12 are free of adjacent obstruction, and at least one of them is removable, as in FIG. 4 or FIG. 5. Thus, the recuperator 10 can be opened and closed to make the interior accessible for inspection, cleaning, or other desired purpose.

10 Claims, 2 Drawing Sheets

EXHAUST GAS RECUPERATOR

FIELD

This invention relates to heat exchange apparatus for receiving exhaust gas from an engine into an enclosure at a high temperature and delivering the gas at a substantially lower temperature to a location farther from the engine. It is especially effective for putting to use what would otherwise become wasted energy in heat pumps, typically refrigerant vapor compression heat pump systems that are driven by combustion engine prime movers.

U.S. Pat. No. 5,003,788, issued Apr. 2, 1991, to Robert D. Fischer for Gas Engine Driven Heat Pump System, and U.S. Pat. No. 5,020,320, issued Jun. 4, 1991, to Sherwood G. Talbert and Frank E. Jakob, for Engine Driven Heat Pump System, are directed to apparatus of a type for which the present invention is particularly advantageous. The invention can be employed to advantage in other types of systems also; in fact for most systems that include a combustion engine and equipment that can make use of heat.

BACKGROUND

The exhaust gas discharged from an internal combustion engine has a high temperature, typically about 850° F. to 1200° F. In some applications the exhaust must be cooled before it is discharged into the atmosphere to reduce the safety hazard of the hot exhaust. Heat recovery mufflers have been used also to recover energy that would otherwise be wasted in the exhaust discharge. The recovered energy can be used directly as heat or it can be converted to mechanical energy to provide a supplement to the main engine drive power. Some heat recovery systems include an exhaust gas muffler that cools the exhaust gas and may provide an auxiliary source of heated water.

In a heat recovery muffler, the main objective is to attenuate the sound energy and remove heat from the exhaust gas, while maintaining the exhaust gas pressure drop within an acceptable limit.

The present exhaust gas recuperator is of the type disclosed in U.S. Pat. No. 4,450,932, issued May 29, 1984, to Mostafa M. Khosropour and Thomas C. Learn, for Heat Recovery Muffler. Typical embodiments of the present invention omit some of the secondary features of the cited muffler (although some of them may be included optionally), and they include other features making them advantageous for certain purposes.

The heat-recovery muffler of Khosropour and Learn (K&L) comprises an outer body with an annular heat exchanger disposed therein and spaced from each end. The heat exchanger has a central opening surrounding an exhaust gas inlet pipe to provide an annular passage. The downstream end of the central opening is closed off so that the flow of exhaust gas through the inlet pipe is reversed and is directed back upstream. A plurality of tubes communicate between opposite ends of the body, so that the exhaust gas then flows downstream through the tubes in heat exchange relation with a cooling medium, such as water, to cool the exhaust gas and heat the cooling medium. The cooled exhaust gas is discharged to the atmosphere through an outlet pipe in the downstream end of the body.

DISCLOSURE

Typical embodiments of the present invention, as shown in FIGS. 2 and 3, include the components and arrangement described above. Simpler embodiments, as shown in FIG. 1, may omit the tubes communicating between opposite ends of the outer body, and the outlet for the cooled exhaust gas may be located at the same end of the outer body as the inlet for the hot exhaust gas.

Heat exchange apparatus according to the present invention differs from that of K&L in the locations of the inlet and outlet for the exhaust gas. In the K&L muffler the inlet and outlet pipes are at each end of the cylindrical outer body, and coaxial therewith. In the present invention the inlet and outlet are in the side wall of the cylindrical body, and the exhaust gas enters and leaves via conduits that are perpendicular to the side wall at the inlet and outlet. So the ends of the body are free of adjacent obstruction, and at least one of the ends is removable, as in FIG. 4 or FIG. 5. Thus, the recuperator can be opened and closed to make the interior accessible for inspection, cleaning, or any other desired purpose.

DRAWINGS

CARRYING OUT THE INVENTION

Figure 1:
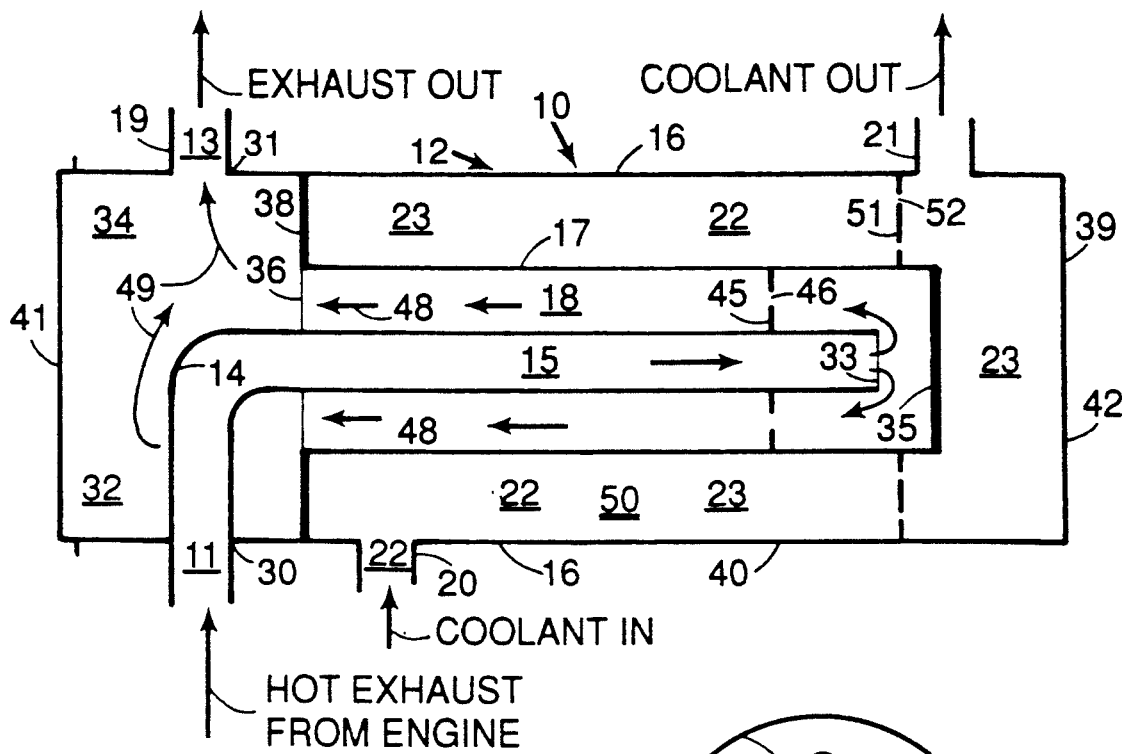
FIG. 1 is a schematic sectional view of a typical simple embodiment of heat exchange apparatus according to the present invention.
Figure 3:
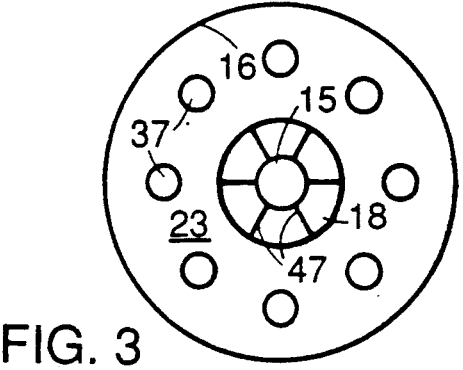
FIG. 3 is a schematic sectional view of apparatus as in FIG. 2, taken in the plane at 3—3 in FIG. 2.
Figure 2:
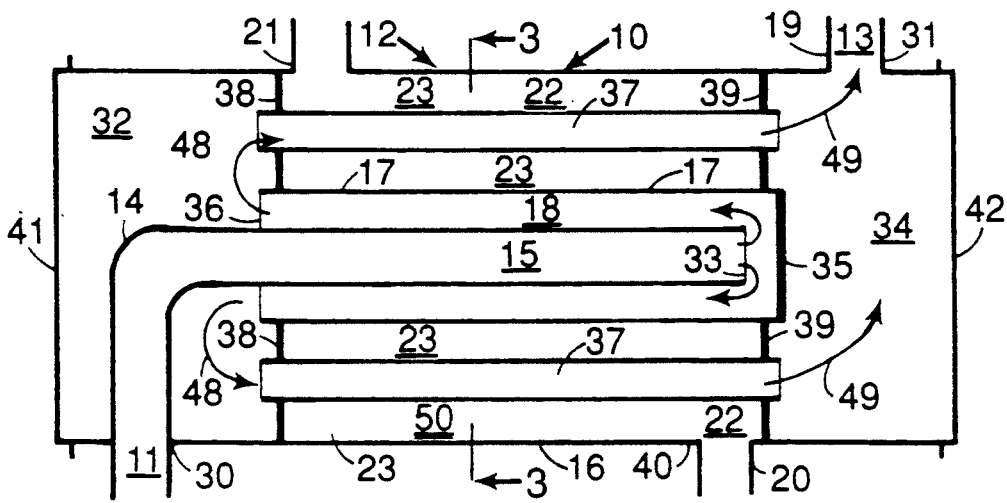
FIG. 2 is a schematic sectional view of a typical moderately more complex embodiment of heat exchange apparatus according to the invention.

Referring now to FIGS. 1-3, typical heat exchange apparatus according to the present invention comprises a recuperator 10 including a generally cylindrical casing or body 12, which is enclosed at its ends by a left end wall 41 and a right end wall 42. Hot exhaust gas 11 from an internal combustion engine is introduced into the recuperator 10 through an inlet 30 by a conduit 14.

Exhaust gas 11 is discharged from recuperator 10 through an outlet 31 by a conduit 19.

Mounted within the body 12 is a heat exchanger 50 including an inner tubular member 17 that is spaced radially outward from the axially extending central portion of the inlet conduit 14, to provide an annular passage 18. The heat exchanger 50 also includes a pair of end walls 38 and 39, which connect the respective ends of the tubular member 17 to the body 12. Thus, the tubular member 17 along with the walls 38 and 39 and the body 12 define a closed heat exchange unit 50.

The downstream right end of the annular passage 18 in the heat exchanger 50 is closed off by an imperforate end wall or closure 35, and the central portion of the inlet pipe 14 typically is supported in the tubular member 17 by an annular flange 45 having a plurality of large holes 46, as in FIG. 1, or by spokes 47, as in FIG. 3.

The exhaust gas 11 entering the recuperator 10 through the inlet 30 via the inlet conduit 14 flows through an inner region 15 therein, and past the open downstream right end 33 of the inlet conduit 14. Then the gas 11 is deflected back upstream by the end closing wall 35 into and through the annular passage 18 in the tubular member 17. The exhaust gas 11 then flows out from the open left end of the passage 18 into the inlet end region 32, as shown by the arrows 48.

In typical simple embodiments of the invention, as illustrated in FIG. 1, the right end wall 42 of the enclosure 12 serves also as the right end wall 39 of the heat exchanger 50, and the tube 17 typically is supported at its right end by an annular flange 51 having a plurality of large holes 52, as in FIG. 1, or by spokes (not shown). As indicated by the arrows 48 and 49 in FIG. 1, the exhaust gas 11 flowing out through the left end 36 of the annular passage 18 proceeds into the outlet region 34 at the upper left end of the enclosure 12, and then leaves the recuperator 10 through the outlet 31 and the outlet conduit 19.

In other typical embodiments of the invention, as illustrated in FIGS. 2-5, the end walls 38, 39 of the heat exchanger 50 are spaced from the respective end walls 41 and 42, and the heat exchanger 50 includes also a plurality of tubes 37 extending longitudinally therethrough. The left or upstream ends of tubes communicate with the inlet region 32 of the recuperator 10, while the right or downstream ends of the tubes 37 communicate with the outlet region 34 of the recuperator 10. As indicated by the arrows 48 and 49 in FIG. 2, the exhaust gas 11 flowing out through the left end 36 of the annular passage 18 then flows from left to right through the tubes 37 into the outlet region 34 at the right end of the enclosure 12, and then leaves the recuperator 10 through the outlet 31 and the outlet conduit 19.

A cooling medium 22, such as water, is supplied to the heat exchanger 50 to cool the exhaust gas 11 that flows within the annular passage 18 and through the tubes 37. Liquid from a inlet supply of the cooling medium 22 flows through an inlet conduit 20 to the cooling region 23 between the end walls 38, 39 of the heat exchanger 50 and substantially surrounding the tubes 17 and 37. The heated liquid 22 is discharged through a liquid outlet conduit 21 to a location where it is used or to a disposal site. With this cooling system the outer surfaces of the recuperator 10 are so cooled as to maintain their temperatures within an acceptable limit; and the exhaust gas 11 is adequately cooled.

Figure 4:
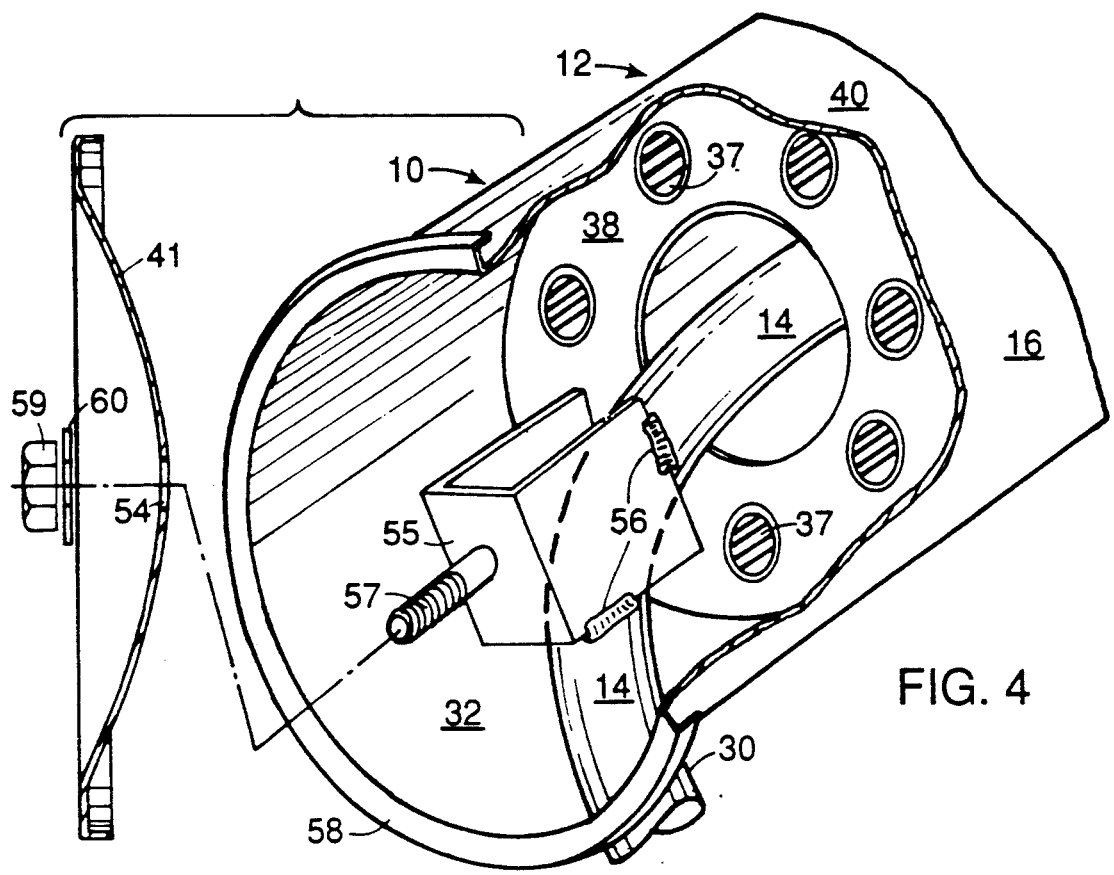
FIG. 4 is an exploded view, partly in section and partly in cut away perspective, of a typical inlet end of apparatus substantially as in FIGS. 2 and 3.

FIG. 4 shows details of a typical inlet end region 32 and adjacent components in a recuperator 10 as in FIGS. 2 and 3. It also illustrates the left end region of a typical recuperator 10 as in FIG. 1, except that the gas outlet 31 and the gas outlet conduit 19 are omitted.

In FIG. 4 a channel (square "U") shaped bracket 55 is securely attached to the inlet conduit 14 in any convenient manner; typically by welded joints as shown at 56, and on the opposite side, where the welds are here hidden from view.

A threaded stud 57, securely attached to the left end of the bracket 55 by any convenient means, such as welds (not shown), protrudes beyond an opening 54 in the center of the left end wall 41 when the left end of the enclosure 12 is assembled, so that the end wall 41 can be held in fluid tight contact all around the rim 58 at the left end of the enclosure 12 by the pressure exerted by a threaded nut 59 and a sealing washer 60 against the wall 41 when the nut 59 is tightened to the proper degree on the stud 57. A gasket (not shown) may be provided between the rim 58 and the end wall 41, to assure fluid tight sealing of the joint.

Figure 5:
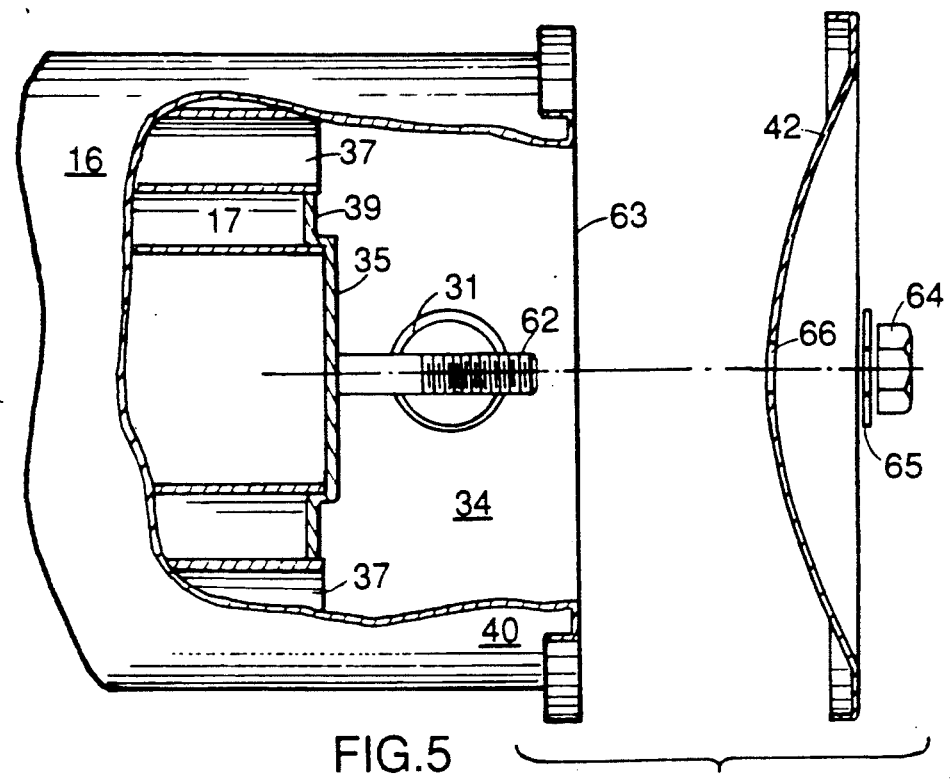
FIG. 5 is an exploded front view, partly in section and partly cut away, of a typical outlet end of apparatus substantially as in FIGS. 2 and 3.

FIG. 5 shows details of a typical outlet end region 34 and adjacent components in a recuperator 10 as in FIGS. 2 and 3. A threaded stud 62 is securely attached to the closed end wall 35 of the tube 17 by any convenient means, such as welds (not shown). The end of the stud 62 protrudes beyond an opening 66 in the center of the right end wall 42 when the right end of the enclosure 12 is assembled, so that the end wall 42 can be held in fluid tight contact all around the rim 63 at the right end of the enclosure 12 by the pressure exerted against the wall 42 by a threaded nut 64 and a sealing washer 65 when the nut 64 is tightened to the proper degree on the stud 62. A gasket (not shown) may be provided between the rim and the end wall 42, to assure fluid tight sealing of the joint.

With arrangements for removal and reattachment as in FIGS. 4 and 5, the end walls 41 and 42 can be quickly removed for inspection or cleaning of the interior of the recuperator 10, or for any other purpose, when the apparatus is not in operation. The end walls 41 and 42 can be reattached also when desired.

To summarize in the format and terminology of the claims, typical heat exchange apparatus 10 according to the present invention for receiving exhaust gas 11 from an engine into an enclosure 12 (having a side wall 40 and opposite end walls 41, 42) at a first temperature and delivering the gas 11 at a lower second temperature to a location 13 spaced from the engine, comprises generically A. means 14 for conveying the gas 11 into the enclosure 12 through the side wall 40 in the proximity of a first end wall 41 and thence in a lengthwise direction toward the opposite second end wall 42 through a first confined region 15 spaced from the exterior 16 of the enclosure 12;

B. means 17 for further conveying the gas 11 in the opposite lengthwise direction back toward the first end wall 41 through a second confined region 18 in the enclosure 12 spaced from the exterior 16 of the enclosure 12 and substantially surrounding the first confined region 15;

C. means 19 for further conveying the gas 11 out of the enclosure 12 through the side wall 40 to the location 13 spaced from the engine;

D. means 20,21 for conveying liquid 22 into (20) and out of (21) the enclosure 12 through the side wall 40 at temperatures lower than the first temperature via a third confined region 23 in the enclosure 12 substantially surrounding the second region 18 and spaced from the first end wall 41; and E. means for removing the first end wall 41 from, and reattaching it to, the side wall 40;

F. whereby the temperatures in the liquid 22 and at the exterior 16 of the enclosure 12 are maintained well below the first temperature and the interior of the apparatus can be made accessible for inspection, cleaning, or other purpose, when not in operation, by removing the first end wall 41.

Typically such apparatus comprises generically, and in more detail,

A. a fluid-tight enclosure 12 having a gas inlet 30 and a gas outlet 31;

B. a gas inlet conduit 14 for receiving the exhaust gas 11 from the engine and conveying the gas 11 through an inlet region 32 and on through a central region 15 in the enclosure 12 to an open end 33 of the gas inlet conduit 14;

C. a larger conduit 17, coaxial with and surrounding a major portion of the gas inlet conduit 14, closed at one end 35 located just beyond the open end 33 of the gas inlet conduit 14, for conveying the gas 11 back through an open opposite end 36 of the larger conduit 17 and communicating with an outlet region 34 in the enclosure 12;

D. a gas outlet conduit 19 for conveying gas 11 out of the enclosure 12 from the outlet region 34 in the enclosure 12;

E. a fluid-tight wall 38 in the enclosure 12, adjacent to the open end 36 of the larger conduit 17, for holding liquid 22 in a confined region 23 around the larger conduit 17 in the enclosure 12;

F. a liquid inlet conduit 20 for receiving cooling liquid 22 and conveying the liquid 22 into the confined region 23 in the enclosure 12 at a first location in the confined middle region 23; and G. a liquid outlet conduit 21 for conveying the liquid 22 out of the enclosure 12 from a second location in the confined region 23;

H. the liquid inlet and outlet conduits 20,21 and at least one of the gas inlet and outlet conduits 14,19 being connected to the side wall 40 of the enclosure 12, and I. at least one of the end walls 41,42 of the enclosure 12 being provided with means for removing it from, and reattaching it to, the side wall 40;

J. whereby the temperatures throughout the cooling liquid 22 and the temperatures on the exterior surface 16 of the enclosure 12 are maintained well below the temperature of the inflowing exhaust gas 11 and the interior of the apparatus can be made accessible for inspection, cleaning or other purpose, when not in operation by removing at least one of the end walls 41,42.

As exemplified in FIGS. 2 and 3, currently preferred heat exchange apparatus 10 according to the present invention for receiving exhaust gas 11 from an engine into an enclosure 12 at a first temperature and delivering the gas 11 at a lower second temperature to a location 13 spaced from the engine, typically comprises A. a cylindrical fluid-tight enclosure 12 having a gas inlet 30 adjacent to one end and a gas outlet 31 adjacent to the opposite end;

B. a gas inlet conduit 14 for receiving the exhaust gas 11 from the engine and conveying the gas 11 into the enclosure 12 through an inlet region 32 in the enclosure 12 adjacent to the gas inlet end 30, and then along the axis of the enclosure 12 to an open end 33 of the gas inlet conduit 14 adjacent to an outlet region 34 in the enclosure 12 adjacent to the gas outlet end 31;

C. a larger conduit 17, coaxial with and surrounding the axial portion of the gas inlet conduit 14, closed at one end 35 located just beyond the open end 33 of the gas inlet conduit 14 adjacent to the outlet region 34 in the enclosure 12, for conveying the gas 11 back through an open opposite end 36 of the larger conduit 17 and into the inlet region 32 in the enclosure 12;

D. a plurality of additional conduits 37 parallel to, spaced from, and substantially evenly distributed around, the larger conduit 17, and open at each end, extending from the inlet region 32 to the outlet region 34, for conveying the gas 11 from the larger conduit 17 on to the outlet region 34 in the enclosure 12;

E. a gas outlet conduit 19 for conveying gas 11 out of the enclosure 12 from the outlet region 34 in the enclosure 12;

F. a pair of fluid-tight walls 38,39 in the enclosure 12, one adjacent to each end of the larger conduit 17 and the additional conduits 37, for holding liquid 22 in a confined middle region 23 comprising all of the space in the enclosure 12 between the inlet region 32 and the outlet region 34 other than the space occupied by the conduits 14,17,37;

G. a liquid inlet conduit 20 for receiving cooling liquid 22 and conveying the liquid 22 into the confined middle region 23 in the enclosure 12 at a location in the cylindrical wall 40 adjacent to a first end 39 of the confined middle region 23; and H. a liquid outlet conduit 21 for conveying the liquid 22 out of the enclosure 12 from a location in the cylindrical wall 40 adjacent to a second end 38 of the confined middle region 23 substantially opposite to the first end 39 thereof;

I. at least one of the gas inlet and outlet conduits 14,19 being connected to the cylindrical wall 40 of the enclosure 12, and J. at least one of the end walls 41,42 being provided with means for removing it from, and reattaching it to, the cylindrical wall 40;

K. whereby the temperatures throughout the cooling liquid 22 and the temperatures on the exterior surface 16 of the enclosure 12 are maintained well below the temperature of the inflowing exhaust gas 11 and the interior of the apparatus can be made accessible for inspection, cleaning, or other purpose, when not in operation, by removing at least one of the end walls 41,42.

As illustrated in FIG. 4; in any heat exchange apparatus as summarized above; typically the side wall 40 has a substantially flat rim 58 at its end contiguous with the first end wall 41, the first end wall 41 has an opening 54 through its center, a threaded stud 57 is securely attached to a fixed member 55 in the enclosure 12 and protrudes through the opening 54 when the first end wall 41 is placed against the rim 58, a sealing washer 60 is placed on the protruding end of the stud 57, and a threaded nut 59 is tightened on the stud 57 against the sealing washer 60 and the end wall 41 to press the contiguous outer surface portion of the end wall 41 into fluid tight contact with the rim 58 of the side wall 40; and the means for removing the first end wall 41 from, and reattaching it to, the side wall 40, comprises the threaded stud 57, sealing washer 60, and threaded nut 59. The apparatus typically comprises also a gasket between the rim 58 of the side wall 40 and the contiguous portion of the end wall 41, to assure fluid tight sealing of the joint.

As illustrated in FIG. 5; in heat exchange apparatus as summarized above, other than simple embodiments of the type shown in FIG. 1; instead of, or in addition to, the means for removing and reattaching the first end wall 41, somewhat similar means may be included for removing and reattaching the second end wall 42. In such apparatus, the side wall 40 has a substantially flat rim 63 at its end contiguous with the second end wall 42, the second end wall 42 has an opening 66 through its center, a threaded stud 62 is securely attached to a fixed member 35 in the enclosure 12 and protrudes through the opening 66 when the second end wall 42 is placed against the rim 63, a sealing washer 65 is placed on the protruding end of the stud 62, and a threaded nut 64 is tightened on the stud 62 against the sealing washer 65 and the end wall 42 to press the contiguous outer surface portion of the end wall 42 into fluid tight contact with the rim 63 of the side wall 40; and the means for conveniently removing the second end wall 42 from, and reattaching it to, the side wall 40, comprises the threaded stud 62, sealing washer 65, and threaded nut 64. The apparatus typically comprises also a gasket between the rim 63 of the side wall 40 and the contiguous portion of the end wall 42, to assure fluid tight sealing of the joint.

APPLICABILITY

An exhaust gas recuperator according to the present invention can be a key element in the performance of a gas heat pump (GHP). The recuperator is designed to recover waste heat from the engine exhaust gas, which can contain the equivalent of as much as 40 percent of the engine's total fuel input. The recuperator on the GHP operates with the engine coolant as the heat recovery fluid. Since the temperature of the engine coolant is normally above the condensing temperature of the exhaust gas, only sensible heat is recovered by the recuperator. This limits the potential heat recovery to about 60 percent of the energy in the exhaust gas.

In a typical GHP system, the engine coolant is heated by the engine as well as by the exhaust gas. During heating mode operation, heat extracted from the coolant is directed indoors and is used to increase the heating performance. Depending on the operating conditions, the coolant capacity provides about 25 to 35 percent of the total heating capacity. Of this portion, approximately 30 to 50 percent of the coolant heat is extracted from the exhaust gas. In a recent field test of the GHP, coolant heat was directed to an outdoor radiator during cooling mode operation. The cooling mode performance of the heat pump can be increased by using coolant heat to supplement the heat required for domestic hot water.

Engine exhaust noise reduction was a significant concern during the development stages of the GHP. Original analysis of the GHP design demonstrated that cost reduction and packaging benefits could be obtained by combining the recuperator and the engine muffler. As a result of this design consideration, engine noise reduction was included as a performance criterion for the recuperator. Other performance criteria for the recuperator included effectiveness, engine exhaust back pressure, and coolant side pressure drop.

Performance tests of available recuperators led to the choice of the K&L heat recovery muffler. The unit provided excellent heat transfer and noise reduction characteristics, as well as exhaust back pressure and coolant pressure drop that were compatible with the engine and the coolant pump.

After 6,000 hours of operation, the recuperator was tested and inspected. Test results showed an increase in exhaust back pressure. An inspection of the recuperator revealed that the heat exchanger tubes were almost completely plugged. While the problem was attributed to engine oil type and consumption rate, it also justified a redesign of the recuperator. To decrease the likelihood of plugging the heat exchanger tubes, the outer diameter of the tube was increased from $\frac{3}{8}$ inch to $\frac{5}{8}$ inch. There has been no evidence of plugging in the modified recuperator units, some of which are small tube units ($\frac{3}{8}$ inch outside diameter) with as many operating hours as the other unit. The favorable experience with the modified recuperators is attributed to a reduced consumption of a lower residue oil along with the larger tube diameter.

Optimal design and conditions of use can reduce the need for inspection and cleaning of the interiors of exhaust gas recuperators, but the accessibility to the interior that is made possible by the present invention still can be advantageous where long term operation is expected and where conditions are not always ideal.

While the forms of the invention herein disclosed constitute currently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

What is claimed is:

1. Heat exchange apparatus 10 for receiving exhaust gas 11 from an engine into an enclosure 12, having a side wall 40 extending substantially parallel to the lengthwise direction of the enclosure 12 and opposite end walls 41,42 closing off opposite ends of the sidewall 40 to define a chamber therein, at a first temperature and delivering the gas 11 at a lower second temperature to a location 13 spaced from the engine, comprising A. means 14 for conveying the gas 11 into the enclosure 12 through the side wall 40 in the proximity of a first end wall 41 and thence in a lengthwise direction toward the opposite second end wall 42 through a first confined region 15 spaced from the exterior 16 of the enclosure 12;

B. means 17 for further conveying the gas 11 in the opposite lengthwise direction back toward the first end wall 41 through a second confined region 18 in the enclosure 12 spaced from the exterior 16 of the enclosure 12 and substantially surrounding the first confined region 15;

C. means 19 for further conveying the gas 11 out of the enclosure 12 through the side wall 40 to the location 13 spaced from the engine;

D. means 20,21 for conveying liquid 22 into (20) and out of (21) the enclosure 12 through the side wall 40 at temperatures lower than the first temperature via a third confined region 23 in the enclosure 12 substantially surrounding the second region 18 and spaced from the first end wall 41; and E. means for removing the first end wall 41 from, and reattaching it to, the side wall 40;

F. whereby the temperatures in the liquid 22 and at the exterior 16 of the enclosure 12 are maintained well below the first temperature and the interior of the apparatus can be made accessible for inspection, cleaning, or other purpose, when not in operation, by removing the first end wall 41; and G. wherein the side wall 40 has a substantially flat rim 58 at its end contiguous with the first end wall 41, the first end wall 41 has an opening 54 through its center, a threaded stud 57 is securely attached to a fixed member 55 in the enclosure 12 and protrudes through the opening 54 when the first end wall 41 is placed against the rim 58, a sealing washer 60 is placed on the protruding end of the stud 57, and a threaded nut 59 is tightened on the stud 57 against the sealing washer 60 and the end wall 41 to press the contiguous outer surface portion of the end wall 41 into fluid tight contact with the rim 58 of the side wall 40; and wherein the means E for removing the first end wall 41 from, and reattaching it to, the side wall 40, comprises the threaded stud 57, sealing washer 60, and threaded nut 59.

2. Heat exchange apparatus as in claim 1, comprising also a gasket between the rim 58 of the side wall 40 and the contiguous portion of the end wall 41, to assure fluid tight sealing of the joint.

3. Heat exchange apparatus 10 for receiving exhaust gas 11 from an engine into an enclosure 12, having a side wall 40 extending substantially parallel to the lengthwise direction of the enclosure 12 and opposite end walls 41,42 closing off opposite ends of the sidewall 40 to define a chamber therein, at a first temperature and delivering the gas 11 at a lower second temperature to a location 13 spaced from the engine, comprising
   A. a fluid-tight enclosure 12 having a gas inlet 30 and a gas outlet 31;
   B. a gas inlet conduit 14 for receiving the exhaust gas 11 from the engine and conveying the gas 11 through an inlet region 32 and on through a central region 15 in the enclosure 12 to an open end 33 of the gas inlet conduit 14;
   C. a larger conduit 17, coaxial with and surrounding a major portion of the gas inlet conduit 14, closed at one end 35 located just beyond the open end 33 of the gas inlet conduit 14, for conveying the gas 11 back through an open opposite end 36 of the larger conduit 17 and communicating with an outlet region 34 in the enclosure 12;
   D. a gas outlet conduit 19 for conveying gas 11 out of the enclosure 12 from the outlet region 34 in the enclosure 12;
   E. a fluid-tight wall 38 in the enclosure 12, adjacent to the open end 36 of the larger conduit 17, for holding liquid 22 in a confined region 23 around the larger conduit 17 in the enclosure 12;
   F. a liquid inlet conduit 20 for receiving cooling liquid 22 and conveying the liquid 22 into the confined region 23 in the enclosure 12 at a first location in the confined middle region 23; and
   G. a liquid outlet conduit 21 for conveying the liquid 22 out of the enclosure 12 from a second location in the confined region 23;
   H. the liquid inlet and outlet conduits 20,21 and at least one of the gas inlet and outlet conduits 14,19 being connected to the side wall 40 of the enclosure 12, and
   I. at least one of the end walls 41,42 of the enclosure 12 being provided with means for removing it from, and reattaching it to, the side wall 40;
   J. whereby the temperatures throughout the cooling liquid 22 and the temperatures on the exterior surface 16 of the enclosure 12 are maintained well below the temperature of the inflowing exhaust gas 11 and the interior of the apparatus can be made accessible for inspection, cleaning or other purpose, when not in operation by removing at least one of the end walls 41,42; and
   K. wherein the side wall 40 has a substantially flat rim 58 at its end contiguous with the first end wall 41, the first end wall 41 has an opening 54 through its center, a threaded stud 57 is securely attached to a fixed member 55 in the enclosure 12 and protrudes through the opening 54 when the first end wall 41 is placed against the rim 58, a sealing washer 60 is placed on the protruding end of the stud 57, and a threaded nut 59 is tightened on the stud 57 against the sealing washer 60 and the end wall 41 to press the contiguous outer surface portion of the end wall 41 into fluid tight contact with the rim 58 of the side wall 40; and wherein the means I for removing the first end wall 41 from, and reattaching it to, the side wall 40, comprises the threaded stud 57, sealing washer 60, and threaded nut 59.

4. Heat exchange apparatus as in claim 3, comprising also a gasket between the rim 58 of the side wall 40 and the contiguous portion of the end wall 41, to assure fluid tight sealing of the joint.

5. Heat exchange apparatus 10 for receiving exhaust gas 11 from an engine into an enclosure 12, having a side wall 40 extending substantially parallel to the lengthwise direction of the enclosure 12 and opposite end walls 41,42 closing off opposite ends of the sidewall 40 to define a chamber therein, at a first temperature and delivering the gas 11 at a lower second temperature to a location 13 spaced from the engine, comprising
   A. a fluid-tight enclosure 12 having a gas inlet 30 and a gas outlet 31;
   B. a gas inlet conduit 14 for receiving the exhaust gas 11 from the engine and conveying the gas 11 through an inlet region 32 and on through a central region 15 in the enclosure 12 to an open end 33 of the gas inlet conduit 14;
   C. a larger conduit 17, coaxial with and surrounding a major portion of the gas inlet conduit 14, closed at one end 35 located just beyond the open end 33 of the gas inlet conduit 14, for conveying the gas 11 back through an open opposite end 36 of the larger conduit 17 and communicating with an outlet region 34 in the enclosure 12;
   D. a gas outlet conduit 19 for conveying gas 11 out of the enclosure 12 from the outlet region 34 in the enclosure 12;
   E. a fluid-tight wall 38 in the enclosure 12, adjacent to the open end 36 of the larger conduit 17, for holding liquid 22 in a confined region 23 around the larger conduit 17 in the enclosure 12;
   F. a liquid inlet conduit 20 for receiving cooling liquid 22 and conveying the liquid 22 into the confined region 23 in the enclosure 12 at a first location in the confined middle region 23; and
   G. a liquid outlet conduit 21 for conveying the liquid 22 out of the enclosure 12 from a second location in the confined region 23;
   H. the liquid inlet and outlet conduits 20,21 and at least one of the gas inlet and outlet conduits 14,19 being connected to the side wall 40 of the enclosure 12, and
   I. at least one of the end walls 41,42 of the enclosure 12 being provided with means for removing it from, and reattaching it to, the side wall 40;
   J. whereby the temperatures throughout the cooling liquid 22 and the temperatures on the exterior surface 16 of the enclosure 12 are maintained well below the temperature of the inflowing exhaust gas 11 and the interior of the apparatus can be made accessible for inspection, cleaning or other purpose, when not in operation by removing at least one of the end walls 41,42; and
   K. wherein the side wall 40 has a substantially flat rim 63 at its end contiguous with the first end wall 42, the second end wall 42 has an opening 66 through its center, a threaded stud 62 is securely attached to a fixed member 35 in the enclosure 12 and protrudes through the opening 66 when the second end wall 42 is placed against the rim 63, a sealing washer 65 is placed on the protruding end of the stud 62, and a threaded nut 64 is tightened on the stud 62 against the sealing washer 65 and the end wall 42 to press the contiguous outer surface portion of the end wall 42 into fluid tight contact with the rim 63 of the side wall 40; and wherein the means I for removing the first end wall 42 from, and reattaching it to, the side wall 40, comprises the threaded stud 62, sealing washer 65, and threaded nut 64.

6. Heat exchange apparatus as in claim 5, comprising also a gasket between the rim 63 of the side wall 40 and the contiguous portion of the end wall 42, to assure fluid tight sealing of the joint.

7. Heat exchange apparatus 10 for receiving exhaust gas 11 from an engine into an enclosure 12, having a side wall 40 extending substantially parallel to the lengthwise direction of the enclosure 12 and opposite end walls 41, 42 closing off opposite ends of the sidewall 40 to define a chamber therein, at a first temperature and delivering the gas 11 at a lower second temperature to a location 13 spaced from the engine, comprising A. a cylindrical fluid-tight enclosure 12 having a gas inlet 30 adjacent to one end and a gas outlet 31 adjacent to the opposite end;

B. a gas inlet conduit 14 for receiving the exhaust gas 11 from the engine and conveying the gas 11 into the enclosure 12 through an inlet region 32 in the enclosure 12 adjacent to the gas inlet end 30, and then along the axis of the enclosure 12 to an open end 33 of the gas inlet conduit 14 adjacent to an outlet region 34 in the enclosure 12 adjacent to the gas outlet end 31;

C. a larger conduit 17, coaxial with and surrounding the axial portion of the gas inlet conduit 14, closed at one end 35 located just beyond the open end 33 of the gas inlet conduit 14 adjacent to the outlet region 34 in the enclosure 12, for conveying the gas 11 back through an open opposite end 36 of the larger conduit 17 and into the inlet region 32 in the enclosure 12;

D. a plurality of additional conduits 37 parallel to, spaced from, and substantially evenly distributed around, the larger conduit 17, and open at each end, extending from the inlet region 32 to the outlet region 34, for conveying the gas 11 from the larger conduit 17 on to the outlet region 34 in the enclosure 12;

E. a gas outlet conduit 19 for conveying gas 11 out of the enclosure 12 from the outlet region 34 in the enclosure 12;

F. a pair of fluid-tight walls 38,39 in the enclosure 12, one adjacent to each end of the larger conduit 17 and the additional conduits 37, for holding liquid 22 in a confined middle region 23 comprising all of the space in the enclosure 12 between the inlet region 32 and the outlet region 34 other than the space occupied by the conduits 14,17,37;

G. a liquid inlet conduit 20 for receiving cooling liquid 22 and conveying the liquid 22 into the confined middle region 23 in the enclosure 12 at a location in the cylindrical wall 40 adjacent to a first end 39 of the confined middle region 23; and H. a liquid outlet conduit 21 for conveying the liquid 22 out of the enclosure 12 from a location in the cylindrical wall 40 adjacent to a second end 38 of the confined middle region 23 substantially opposite to the first end 39 thereof;

I. at least one of the gas inlet and outlet conduits 14,19 being connected to the cylindrical wall 40 of the enclosure 12, and J. at least one of the end walls 41,42 being provided with means for removing it from, and reattaching it to, the cylindrical wall 40;

K. whereby the temperatures throughout the cooling liquid 22 and the temperatures on the exterior surface 16 of the enclosure 12 are maintained well below the temperature of the inflowing exhaust gas 11 and the interior of the apparatus can be made accessible for inspection, cleaning, or other purpose, when not in operation, by removing at least one of the end walls 41,42; and L. wherein the side wall 40 has a substantially flat rim 58 at its end contiguous with the first end wall 41, the first end wall 41 has an opening 54 through its center, a threaded stud 57 is securely attached to a fixed member 55 in the enclosure 12 and protrudes through the opening 54 when the first end wall 41 is placed against the rim 58, a sealing washer 60 is placed on the protruding end of the stud 57, and a threaded nut 59 is tightened on the stud 57 against the sealing washer 60 and the end wall 41 to press the contiguous outer surface portion of the end wall 41 into fluid tight contact with the rim 58 of the side wall 40; and wherein the means J for removing the first end wall 41 from, and reattaching it to, the side wall 40, comprises the threaded stud 57, sealing washer 60, and threaded nut 59.

8. Heat exchange apparatus as in claim 7, comprising also a gasket between the rim 58 of the side wall 40 and the contiguous portion of the end wall 41, to assure fluid tight sealing of the joint.

9. Heat exchange apparatus 10 for receiving exhaust gas 11 from an engine into an enclosure 12, having a side wall 40 extending substantially parallel to the lengthwise direction of the enclosure 12 and opposite end walls 41, 42 closing off opposite ends of the sidewall 40 to define a chamber therein, at a first temperature and delivering the gas 11 at a lower second temperature to a location 13 spaced from the engine, comprising A. a cylindrical fluid-tight enclosure 12 having a gas inlet 30 adjacent to one end and a gas outlet 31 adjacent to the opposite end;

B. a gas inlet conduit 14 for receiving the exhaust gas 11 from the engine and conveying the gas 11 into the enclosure 12 through an inlet region 32 in the enclosure 12 adjacent to the gas inlet end 30, and then along the axis of the enclosure 12 to an open end 33 of the gas inlet conduit 14 adjacent to an outlet region 34 in the enclosure 12 adjacent to the gas outlet end 31;

C. a larger conduit 17, coaxial with and surrounding the axial portion of the gas inlet conduit 14, closed at one end 35 located just beyond the open end 33 of the gas inlet conduit 14 adjacent to the outlet region 34 in the enclosure 12, for conveying the gas 11 back through an open opposite end 36 of the larger conduit 17 and into the inlet region 32 in the enclosure 12;

D. a plurality of additional conduits 37 parallel to, spaced from, and substantially evenly distributed around, the larger conduit 17, and open at each end, extending from the inlet region 32 to the outlet region 34, for conveying the gas 11 from the larger conduit 17 on to the outlet region 34 in the enclosure 12;

E. a gas outlet conduit 19 for conveying gas 11 out of the enclosure 12 from the outlet region 34 in the enclosure 12;

F. a pair of fluid-tight walls 38,39 in the enclosure 12, one adjacent to each end of the larger conduit 17 and the additional conduits 37, for holding liquid 22 in a confined middle region 23 comprising all of the space in the enclosure 12 between the inlet region 32 and the outlet region 34 other than the space occupied by the conduits 14,17,37;

G. a liquid inlet conduit 20 for receiving cooling liquid 22 and conveying the liquid 22 into the confined middle region 23 in the enclosure 12 at a location in the cylindrical wall 40 adjacent to a first end 39 of the confined middle region 23; and H. a liquid outlet conduit 21 for conveying the liquid 22 out of the enclosure 12 from a location in the cylindrical wall 40 adjacent to a second end 38 of the confined middle region 23 substantially opposite to the first end 39 thereof;

I. at least one of the gas inlet and outlet conduits 14,19 being connected to the cylindrical wall 40 of the enclosure 12, and J. at least one of the end walls 41,42 being provided with means for removing it from, and reattaching it to, the cylindrical wall 40;

K. whereby the temperatures throughout the cooling liquid 22 and the temperatures on the exterior surface 16 of the enclosure 12 are maintained well below the temperature of the inflowing exhaust gas 11 and the interior of the apparatus can be made accessible for inspection, cleaning, or other purpose, when not in operation, by removing at least one of the end walls 41,42; and L. wherein the side wall 40 has a substantially flat rim 63 at its end contiguous with the first end wall 42, the second end wall 42 has an opening 66 through its center, a threaded stud 62 is securely attached to a fixed member 35 in the enclosure 12 and protrudes through the opening 66 when the second end wall 42 is placed against the rim 63, a sealing washer 65 is placed on the protruding end of the stud 62, and a threaded nut 64 is tightened on the stud 62 against the sealing washer 65 and the end wall 42 to press the contiguous outer surface portion of the end wall 42 into fluid tight contact with the rim 63 of the side wall 40; and wherein the means J for removing the first end wall 42 from, and reattaching it to, the side wall 40, comprises the threaded stud 62, sealing washer 65, and threaded nut 64.

10. Heat exchange apparatus as in claim 9, comprising also a gasket between the rim 63 of the side wall 40 and the contiguous portion of the end wall 42, to assure fluid tight sealing of the joint.

* * * * *